United States Patent

[11] 3,617,285

| [72] | Inventor | William Joseph Staudenmayer |
| | | c/o Kodak Park Division, Rochester, N.Y. 14650 |
| [21] | Appl. No. | 868,225 |
| [22] | Filed | Oct. 21, 1969 |
| [45] | Patented | Nov. 2, 1971 |
| [73] | Assignee | Eastman Kodak Company |
| | | Rochester, N.Y. |

[54] LIGHT INTENSIFYING SCREENS
18 Claims, No Drawings

| [52] | U.S. Cl. | 96/82, 250/80, 252/301.2 R, 260/860 |
| [51] | Int. Cl. | G03c 1/92, H01j 1/64 |
| [50] | Field of Search | 96/82; 250/80; 260/860; 252/301.2 |

[56] References Cited
UNITED STATES PATENTS

| 2,409,162 | 10/1946 | Staud | 96/82 |
| 2,819,183 | 1/1958 | Alles | 250/80 |
| 3,010,043 | 11/1961 | Wahlig | 250/80 |
| 3,028,365 | 4/1962 | Schnell et al. | 260/30.2 |
| 3,282,697 | 11/1966 | Blank et al. | 250/65 |
| 3,287,442 | 11/1966 | Caldwell et al. | 260/860 |
| 3,512,984 | 5/1970 | Amano et al. | 252/301.2 |

*Primary Examiner*—John T. Goolkasian
*Assistant Examiner*—George W. Moxon, II
*Attorneys*—William H. J. Kline, Bernard D. Wiese and Allen P. Rosenberg ABSTRACT: Improved inorganic phosphor screens comprising a support bearing a layer comprising a binder comprising a mixture of macromolecular bisphenol polycarbonates and copolymers comprising said bisphenol polycarbonates and poly(alkylene oxides) are described for radiographic use. Radiographic film-screen combinations are also disclosed.

LIGHT INTENSIFYING SCREENS

BACKGROUND OF THE INVENTION

1. Field of the Invention

This invention relates to new and improved intensifying screens for radiography. In one aspect, this invention relates to intensifying screens comprising inorganic phosphors. In still another aspect, this invention relates to improved flexible binders for said phosphor-containing screens which are capable of demonstrating high efficiency of light intensification and a high degree of radiographic image sharpness.

2. Description of the Prior Art

In the radiographic art, it is known that in order to minimize distortion and diffusion and thus enhance the accuracy of the formed image, a highly effective radiation intensifying screen is essential. The effectiveness of such screens, however, depends in part upon the total amount of radiation which is absorbed and in part upon the efficiency with which the phosphor contained in the screen, is able, when exposed to X-rays, to convert the absorbed radiation into useful emitted radiation.

Heretofore it has been generally acknowledged that optimum film-image sharpness is derived principally from those phosphor particles or layers containing said particles which are in closest proximity to the film. Consequently, it has been widely accepted that light emission is directly proportional to the screen thickness, i.e., coating coverage of the phosphor because the increased coverage gives rise to increased X-ray absorption.

Further, it has been concluded and generally accepted heretofore, that the best types of phosphor-containing intensifying screens were those having a thin phosphor layer in order to reduce diffusion of emitted light and those made from materials having high incident X-ray absorption. Consequently, prior to this time appears little evidence of any substantial progress or attempts to provide thicker and more densely coated, i.e. more highly absorbent and/or efficient, screens.

In addition, prior attempts to provide so-called "fast" screens, i.e. those having greater phosphor coverage and increased X-ray absorption, have oftentimes resulted in unwanted diffusion of the light emitted by the screen leading to unsharpness of the radiographic image.

While a wide variety of resins has been used heretofore as screen binders, such as cellulose nitrate, the poly (alkyl acrylates) and poly(alkylmethacrylates) or chlorosulfonated polyethylene, particular physical disadvantages in their use nevertheless appear, such as, for example, poor abrasion resistance, lack of resiliency, cracking and crazing. These unwanted characteristics are particularly apparent when thicker and heavier phosphor screen coverage is attempted. In addition to having these disadvantages, these binders impart only normal speed to the radiographic system in which they are used. Even further, inefficient intensification screens have been characterized by their inability to emit radiation capable of reaching the image-forming radiographic film in useful amounts. By employing substantially more efficient fluorescent phosphors, those skilled in the art have achieved a comparatively more efficient screen but heretofore have not made substantial or dramatic progress in screen efficiency and image sharpness by reason of the screen binder.

Certain polymers such as polystyrene, polycarbonates, poly(vinyl acetate) and the like have been used heretofore for intensifying screens. For example, in U.S. Pat. No. 3,282,697 issued Nov. 1, 1966, to Blank et al. solvent soluble organic fluorescent substances were used in order to produce a solid cast film binder. In U.S. Pat. No. 2,968,725, issued Jan. 17, 1961, to Ter-Pogossian, substantial light intensification was achieved by employing other than heavy ion-containing inorganic phosphors, such as tungstate and lead.

It is evident therefore that improved fluorescent inorganic ion-containing phosphor screens which have high radiation absorption and are convenient, inexpensive, and safe to use to achieve improved radiographs, will greatly enhance the radiographic, industrial, and healing arts.

SUMMARY OF THE INVENTION

In accordance with this invention, there is provided an improved inorganic, i.e. ion-containing phosphor intensifying screen comprising a support bearing a layer comprising a binder for said phosphor which binder permits the coating of phosphor at an extraordinarily high coverage heretofore unattainable. The ability of said new and improved intensifying screens to absorb greater quantities of radiation and to efficiently convert said absorbed radiation into useful emitted radiation is vividly exemplified in the examples hereafter. Further, said novel screens comprising the binders enable the greatly increased phosphor coverage to remain efficient while still possessing the physical characteristics required for continued and extended use.

In one particular aspect, in the radiographic art it sometimes becomes necessary to raise the concentration of the intensifying screen vehicle, or binder, for example, in order to provide improved screen durability as required for reusable screens but still retain some degree of flexibility for ease of handling. I have found that these results are most unexpectedly and advantageously achieved in the practice of my invention by employing elastomeric polymeric carbonates comprising various proportions of physical mixtures of macromolecular polycarbonates of a bisphenol, such as bisphenol A, with copolymers comprising various said bisphenols, and more particularly poly[4,4'-isopropylidene diphenylene carbonate] and poly(alkylene oxides), such as poly(tetramethylene oxide), poly(hexamethylene oxide), poly(ethylene oxide), and the like.

It is an object of the present invention to provide longlasting and reusable intensifying screens which possess necessary physical characteristics including flexibility and which exhibit improved intensification.

It is another object of this invention to provide X-ray intensifying screens comprising elastomer containing polymer binders capable of withstanding substantially increased phosphor coverage which exhibit improved light intensification and possess desirable physical characteristics.

It is yet another object of this invention to provide improved screens comprising a porous and noncontinuous phase comprising a mixture of a polycarbonate polymeric component and an elastomeric component as binders for inorganic phosphors.

Other objects of this invention will become apparent to those skilled in the art from an examination of the specification and claims which follow.

DESCRIPTION OF PREFERRED EMBODIMENTS

In accordance with my invention, the above and other objects are attained with an intensifying screen comprising a support bearing a fluorescent metal ion-containing material, i.e. a phosphor, carried in a binder comprising an elastomeric polymer mixture containing derivatives of a bisphenol comprising recurring carbonate units having the following formula:

(I)
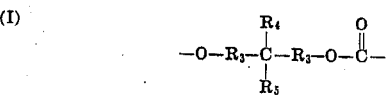

wherein each $R_3$ is a phenylene radical including halo substituted phenylene radicals and alkyl substituted phenylene radicals. $R_4$ and $R_5$, when taken separately, can each be a hydrogen atom, an aryl or alkyl radical. Examples of said alkyl radicals include those having from one to 10 carbon atoms such as methyl, ethyl, propyl, isopropyl, butyl, tertiary butyl, pentyl, hexyl, heptyl, octyl, nonyl, decyl and the like including substituted alkyl radicals such as trifluoromethyl, and the like.

Aryl radical examples include those such as phenyl and naphthyl including substituted aryl radicals having such substituents as a halogen, alkyl radicals containing from one to five carbon atoms and the like. $R_4$ and $R_5$, when taken together, can represent the carbon atoms necessary to form a cyclic hydrocarbon radical including cycloalkanes such as cyclohexyl and polycycloalkanes such as norbornyl, the total number of carbon atoms in $R_4$ and $R_5$ being up to 19. In one preferred embodiment, said bisphenol polycarbonate is poly [4,4'-isopropylidene diphenylene carbonate]. Such bisphenol compositions alone are disclosed, for example, in U.S. Pat. Nos. 3,028,365 and 3,317,466. Preferably polycarbonates containing an alkylidene diarylene moiety in the recurring unit such as those prepared with Bisphenol A and including polymeric products of ester exchange between diphenylcarbonate and 2,2-bis(4-hydroxyphenyl)propane are used in the practice of this invention. Such compositions are disclosed in the following U.S. Pat. Nos.: 2,999,750; 3,028,874; 3,028,879; 3,038,880; 3,106,544; 3,106,545 and 3,106,546.

The other component of the elastomer polymer mixture is a block copolycarbonate comprising recurring units having structure (I) above copolymerized with the blocks composed of recurring units having the following formula:

(II)

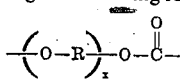

wherein R is an alkylene group having from one to six carbon atoms, e.g. ethylene, trimethylene, tetramethylene, and the like; and x is an integer such that the molecular weight of the recurring unit $(R-O)_x$ is about 100 to 10,000. Said copolycarbonate comprises about 5 to about 95 weight percent, preferably about 20 to about 90 weight percent, and more preferably about 35 to about 65 weight percent of said recurring units of structure I. The copolycarbonate is characterized by having a heat softening temp in the range of from about 75° to 225° C. and preferably 100° to 150° C.

By recurring, it will be understood to mean to refer to units which are repeating but not necessarily at uniform intervals.

In one preferred embodiment, the bisphenol used in preparing said binder layer is a bisphenol carbonate comprising recurring units having the following formula said carbonate composed of from about 3 to about 50 such units:

(III)

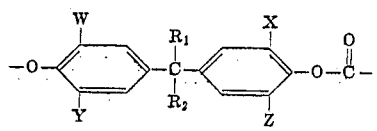

wherein each of W,X,Y and Z represents a member selected from the group consisting of hydrogen, chlorine, fluorine and methyl and each of $R_1$ and $R_2$ represents a member selected from the group consisting of hydrogen, 1-6 carbon alkyl, phenyl, chlorinated 1-6 carbon alkyl, fluorinated 1-6 carbon alkyl, chlorinated phenyl and fluorinated phenyl.

Said bisphenol consists of a highly polymeric material having an inherent viscosity of from about 0.4 to about 3.5, at a concentration of .25 g./100 ml. solution at 25° C.

The preparation of the polycarbonate polymers of the same general class as those disclosed in the practice of my invention is well known in the art. Among said prior art are various literature references including an article by Schnell as to polycarbonate resins, generally, as a new class of plastics and the preparation and properties of aromatic polyesters of carbonic acid, *Angewandte Chemie*, 68; 633–660, No. 20, Oct. 21, 1956.

Particularly preferred polycarbonate polymer mixtures are comprised of copolymers of component (I) and component (II) and preferably components (II) and (III). Said copolymers comprise from about five to about 95 and preferably from about 30 to about 70 weight percent of component (III) and the remainder being component (II).

The radiographic screens of my invention can be constructed such that they are either nonintegral i.e. separate, or they can be integral, i.e. combined as a distinct layer in an element comprising a silver halide emulsion coated onto the same support as the intensifying screen. Further, they can be either reusable or disposable after the first or limited uses.

The image-recording element so described preferably comprises duplitized silver halide coatings borne by a suitable support but single coatings are also suitably used. The silver halide can comprise varying amounts of silver chloride, silver iodide, silver bromide, silver chlorobromide, silver bromoiodide and the like. Particularly good results are obtained with silver bromoiodide emulsions in which the average grain size of the silver bromoiodide grains is in the range of about 0.5 to about 5 microns and preferably in the range of about 0.5 to about 1.6 microns.

The silver halide coatings can contain any of the hydrophilic, water permeable binding materials suitable for this purpose. Such suitable materials include gelatin, colloidal albumen, polyvinyl compounds, cellulose derivatives, acrylamide polymers and the like alone or in combination and mixture. The binding agents for the emulsion layer of the photographic element can also contain dispersed polymerized vinyl compounds. Certain of these compounds are disclosed for example in U.S. Pat. No. 3,142,568 of Nottorf issued July 28, 1964; 3,193,386 of White issued July 6, 1965; 3,062,672 of Houck et al. issued Nov., 1962; and 3,220,844 of Houck et al., issued Nov. 30, 1965, and include the water insoluble polymers and latex copolymers of alkyl acrylates and methacrylates, acrylic acid sulfoalkylacrylates or methacrylates and the like.

Each of these photographic silver halide coatings generally comprises silver in the range of about 275 to about 625 mg. of silver per square foot but good results are obtained using coverages having a range of about 300 to about 450 mg. per square foot.

These silver halide layers can also contain certain additives, particularly those known to be beneficial in such layers. For example, they can contain speed increasing compounds, such as the onium salts like quaternary or ternary, e.g. sulfonium salts, polyalkylene glycols, thioethers and the like. The photographic silver halide coatings can be stabilized with mercury compounds, azaindenes, quaternary benzothiazolium compounds, hydroxy substituted aromatic compounds, and the like.

The photographic silver halide emulsions or coatings disclosed herein can also contain non-ionic, anionic and/or amphoteric coating aids. Some useful coating aids include, for example, saponin, alkyl substituted aryl oxy alkylene ethyl sulfonates of the type described in U.S. Pat. No. 2,600,831, issued June 17, 1952, maleopimarates of the type described in U.S. Pat. No. 2,823,123 issued Feb. 11, 1958, taurine derivatives of the type described in U.S. Pat. No. 2,739,891 issued Mar. 27, 1956 and alkyl aminopropionates of the type described in U.S. Pat. No. 3,133,816 issued May 19, 1964. Typical of still other coating aids and surfactants which can be employed in the emulsions of this invention include the alkyl phenoxy poly(glycidols) having from about 5 to about 12 glycidol units, for example such as those disclosed in British Pat. No. 1,22,878 issued Mar. 16, 1966 to Olin Mathieson.

These photographic emulsions and coatings can contain incorporated developing agents such as polyhydroxy benzenes, aminophenols and 1-aryl-3-pyrazolidones and the like. The photographic coatings and emulsions can also contain spectral sensitizers such as cyanines, merocyanines, complex (trinuclear) cyanines and complex (tri-nuclear) merocyanines, styryls and hemicyanines.

In addition these silver halide radiographic emulsions and coatings can be chemically sensitized with compounds of the sulfur group, noble metal salts, such as gold salts, reduction sensitized with reducing agents and combinations of these. Furthermore, these sensitive layers and other layers present in the elements of this invention can be hardened with any suitable hardener or combinations such as aldehyde hardeners, hardeners which are derivatives of dioxane, vinyl sulfones, oxypolysaccharides such as oxystarch, oxyplant gums, inorganic hardeners such as chromium salts and the like.

It will be understood by those skilled in the art that the radiographic image recording elements disclosed herein can be processed in a variety of ways, such as by use of the manual conventional multitank methods well known in the art and in the automatic processing systems disclosed in Belgian Pat. No. 700,301 issued Aug. 31, 1967 to Barnes, Rees and Wilt and by the methods disclosed in U.S. Pat. No. 3,232,761 issued Feb. 1, 1966 to Allen and Burness, for example. These elements comprise a support which is substantially transparent or lightly tinted and is reasonably flexible so as to permit both conventional processing utilizing a series of processing tanks and a rapid access processing employing transport systems such as a mechanized roller transport system. Typical of said supports are cellulose nitrate film, cellulose ester film, polyvinyl acetal film, polystyrene, polyethylene terephthalate film and other polyester film and the like. In a preferred embodiment the support comprises a linear condensation polymer of high molecular weight. One suitable polymer of this type is polyethylene terephthalate which can be melt extruded to form bases of varying thicknesses as desired, e.g., in the range of about 1 to about 10 mils. Polymers of this type are often melt extruded at temperatures in the range of about 270° C. to about 305° C. Due to their stability upon melt extrusion at such temperatures, the furanone ultraviolet absorbing materials described hereinafter form a preferred class of compounds which can be incorporated into such a base. In addition, the furanones are compatible with and nonsubliming in polyethylene terephthalate base.

These linear polyester materials are linear polyesters of at least one glycol having two to 10 carbon atoms and at least one dibasic acid comprising at least 50 mole percent of an acid having two carboxyl radicals attached to a carbocyclic nucleus having from four to six carbon atoms per ring, said ester having a number average molecular weight of 10,000 to about 100,000, an inherent viscosity in a mixture of 60 percent phenol and 40 percent tetrachloroethane of at least 0.3 and melting at from abut 175° to about 350° C.

In addition, the ultraviolet and visible light absorbing materials can be employed in the practice of this invention provided they possess the characteristics of solvent stability, and compatibility with other absorbing materials possessing similar characteristics in order that they can be used alone or in combination therewith. In addition, the ultraviolet absorbing compounds employed in the practice of this invention are nonproteinaceous and possess little or no absorbing capability in the visible range of the electromagnetic spectrum. This means that the absorbers are most effective at wavelengths of about 410 nm. or less. It is equally important that these ultraviolet, nonfluorescing absorbers be essentially noncolor imparting in order to obviate extensive leaching or bleaching processes as are required for fugitive type and sometimes pigmented absorbers.

Solvents useful for preparing coating compositions for the screen binders with the elastomer-polycarbonate mixtures of the present invention can include a wide variety or organic solvents for the components of the coating composition. For example, benzene; toluene; acetone; 2-butanone; chlorinated hydrocarbons such a methylene chloride; ethylene chloride; and the like; ethers, such as tetrahydrofuran and the like, or mixtures of such solvents can advantageously be employed in the practice of this invention.

The X-ray intensifying screen can emit in a wide spectral range and, depending upon the phosphor used in said screen can have a substantial part, that is, more than half, of its total spectral emission at less than about 410 nm. This emission is substantially in the ultraviolet range of the spectrum and I have found that certain inorganic, i.e. metal-ion-containing phosphors are particularly useful therefor. Such phosphors have a physical density greater than at least about 3.5 g./cm.$^3$ and preferably greater than 3.9 g./cm.$^3$. However, I have produced particularly effective novel screens in the practice of my invention by using inorganic metal phosphors, including those made from the lanthanide group of the periodic table. The latter rare earth elements have an atomic number in the range between 58 to 71 and include lanthanum, cerium, samarium, gadolinium and the like. Particularly effective metal ion-containing phosphors are those selected from the group consisting of lead sulfate, lanthanide- or lead-activated $BaSO_4$, europium-activated barium strontium sulfate, lead-activated barium silicates, gadolinium-activated yttrium oxide, lanthanide or lead-activated strontium sulfate where the lanthanide activator has more than half its emission in the ultraviolet region, and barium fluoride, barium fluoride chloride and the like. Said phosphors can be prepared in a number of ways, such as set forth in Belgian Pat. No. 703,998 issued Mar. 18, 1968 to Luckey, in Buchanan et al., *J. Applied Physics*, Vol. 39, pp. 4342–4347 (1968) and in Clapp and Ginther, *J. Opt. Soc. Amer.*, Vol. 37, No. J pp. 355–362 (1947). In practicing this invention, I have found useful, those fluorescent screens which emit in various wide spectral ranges, for example, substantially in the ultraviolet electromagnetic spectral range. I have likewise found that equally satisfactory results are achieved by using phosphors which have their relative energy of emission peak in the near ultraviolet or ultraviolet regions, that is, about 410 nm. or less. Lead-activated barium sulfate is such an example since it emits in both the blue and ultraviolet regions but peaks in the near ultraviolet at about 370 nm. Calcium tungstate, although it emits only a minor portion in the ultraviolet region and peaks in the blue region, is equally effective when combined in the binder disclosed herein. Further by various processing means, such as grinding, bombarding, fluid energy processing and the like, desirable phosphor particle sizes and configurations are obtained. A preferred average microscopic size is from about 0.1 to about $30\mu$ and a particularly useful range is from about 1 to about $15\mu$ in which case about 80 percent of the particles fall within an average size range of about 8–9 microns. Consequently, the X-ray intensifying screens used in our combinations are comprised of phosphors of various sizes and, preferably, emit substantial amounts of radiation at wavelengths even below about 380 nm. The fluorescent intensifying screens which are part of my invention comprise a phosphor or combinations thereof which can be dispersed or suspended in a suitable binder such as set forth hereafter.

This binder may be further characterized as a coherent, film-forming macromolecular polymer binder which forms a discontinuous phase after casting and contains the phosphor interstitially therein. The phosphors can be present in the binder in an unexpectedly wide range of coverages such as, for example, from about 30:1 to about 4:1 and preferably in the range of about 16:1 to about 6:1. The coverage of said phosphor is particularly effective in the screen in a wise range from about 5 to about 90 grams/ft.$^2$ and particularly good results are achieved when the phosphor coverage is within the range of about 10 to about 76 grams/ft.$^2$ and preferably about 10 to about 55 grams/ft.$^2$ while still maintaining the required physical characteristics set forth above. Likewise these screens can be coated in a variety of ways such as directly over the photographic layer or on both sides of a duplitized or single coated element. Intermediate layers, protective or overcoat layers and the like can also be employed between the screen support and the phosphor layer or over the phosphor layer comprising the intensifying screen. Said intermediate, protective overcoat and the like layers can comprise hydrophilic colloid material such as gelatin, gelatin derivatives, cellulose esters, alkyl acrylate-containing polymers and the like. In addition, these said layers can be opaque or substantially transparent in order to provide optimum speed, sharpness and mottle.

Suitable supports for the screens are those having properties which permit their ready passage through a rapid automatic processor in cases where the screen is integral, for example, Said support should therefore be reasonably flexible and preferably transparent, but able to maintain the dimensional stability and integrity of the various coatings thereon. Typical screen supports are cellulose esters, such as cellulose nitrate, poly(vinyl acetal), polystyrene, poly(ehtylene terephthalate), other polyesters, and the like. Supports such as cards or paper which are coated with alpha-olefin polymers, particularly polymers of alpha-olefins containing two or more carbon atoms, as exemplified by polyethylene, polypropylene, ethylene-butylene copolymers and the like, can also be used.

While a wide range of concentrations and ratios of the polycarbonate elastomer resin combination in the vehicle is effective, I have found that a preferred range exists using between about 2 to about 15 percent based on the total weight of phosphor in the screen, of the polycarbonate elastomer-containing binder and that the ratio of polycarbonate to elastomer can effectively be within about 12:1 to about 1:1 and preferably about 9 to 2.

An unexpected and substantial advantage in the practice of my invention resides in the final configuration assumed by the phosphor-containing screen binder. This configuration is an open-pore structure and the mixture of high molecular weight block unit copolymers described herein provides a discontinuous, cellular structure in whose interstices the phosphor particles are trapped without having their emitting and reflecting surfaces totally occluded by the vehicle. These binder vehicles an is a trademark of the General Electric Company for poly(bisphenol A carbonate)] screen alone is only partially overcome by the additional step of heat curling or relaxing at about 140° to 145° C. in an oven for several minutes. Phosphor coverage is elevated in all vehicles to those densities which assure the optimum sharpness but which, as shown, with Lexan alone are characterized by reduced sharpness, decreased flexibility and increased curling and overall stiffness. Screen efficiency is that value determined by dividing speed value by phosphor coverage.

In order to demonstrate the marked improvement in image sharpness of an image produced in a radiographic element, the screens described herein are used in combination with an integral duplitized radiographic sensitive film. These films are double coated at a thickness of 425 mg. of silver per square foot of coating. After exposure of the object to be recorded to a 70 kv. radiation source, the radiographic element is processed and the image sharpness recorded. Processing is effected in this instance by employing a unidirectional high speed roller system apparatus of the type described in Belgian Pat. No. 700,301 issued Aug. 31, 1967, which apparatus is commercially available under the name of R. P. X-OMAT, a trademark of the Eastman Kodak Company.

While good results are obtained such as those set forth hereafter for said duplitized coated films, equally good results of image sharpness are obtained with single coated

TABLE I

| Binder vehicle | Physical characteristics of screen | Phosphor coverage, 3/ft.² | Screen efficiency | Relative sharpness [1] |
|---|---|---|---|---|
| (a) 11% Lexan | Stiff, curled, inflexible | 33 | 3.4 | 1 |
| (b) 11% Lexan | Rigid, stiff, initially sharp cracks | 38 | ([2]) | ([2]) |
| (c) 3% elastomer | Flexible, flat | 31 | 4.2 | 1 |
| (d) 3% elastomer | do | 36 | 4.03 | 2 |
| (e) Mixture of 1.5% elastomer and 1.5% Lexan | do | 34 | 4.1 | 1 |
| (f) Mixture of 1.5% elastomer and 1.5% Lexan | do | 38 | 3.8 | 2 |

[1] 1 denotes sharpest, 5 denotes least sharp.
[2] Incapable of determining due to severe cracking after initial use.

are comprised as shown above by formula of units of a linear polycarbonate of a bisphenol, preferably bisphenol A, mixed with a linear copolymer of said polycarbonate with a polyalkoxide, such as polytetramethylene oxide, having a molecular weight of up to about 10,000. Further, I have not only obviated the necessity of heat relaxing or otherwise treating the binder vehicle after incorporation therein of the phosphor to promote the desired physical characteristics, but, have unexpectedly obtained increased screen efficiency.

In addition a most desirable and outstanding property of flexibility is achieved in the screens of my invention by employing a layer having a binder comprising the elastomeric copolycarbonate described herein. This physical property and still others are substantially different from and are an improvement over properties exhibited by other copolymers previously used for the same purpose.

The screens of my invention are capable of exhibiting a scatter coefficient with the polycarbonate-containing binder as described hereinabove, in the range of from about 200 to about 500 cm.[11] and preferably in the range of 300 to about 500 cm[11].

By use of the term scatter coefficient it will be understood to mean that coefficient which describes the attenuation of light achieved by its scattering in a turbid medium defined by employing the known equations of Kubelka-munk in the reference set forth in example 2 hereafter.

The following examples are included for a further understanding of my invention.

EXAMPLE 1

The superiority of screen vehicles comprising elastomeric polycarbonate mixtures described above is demonstrated by contrasting various such screens with others containing only bisphenol A polycarbonate at its optimum binder level. It is noted that the subsequent curl exhibited by the Lexan [Lexfilms and nonintegral film screen combinations.

Thus it is seen that, even in those cases (c) through (f) where the phosphor coverage is increased, substantially higher screen efficiency is achieved than that achieved in (a) and (b) at similar coverage. Sharpness remains comparable or equal. Equally important is the fact that less screen binder vehicle is required to provide optimum phosphor coverage, sharpness and screen efficiency where the combination of elastomer and polycarbonate is employed in the binders of the present invention.

EXAMPLE 2

In order to determine certain optical properties of the screen layers of the present invention, such as image sharpness and screen efficiency, the formula of Kubelka-Munk set forth by Wendtlandt and Hecht in *Reflectance Spectroscopy*, Interscience, (1966), is employed. This formula which determines the interrelationship between screen layer scattering and light absorption, is as follows:

$$K=(k^2+2ks)^{1/2}$$

wherein $K$ = extinction coefficient, $k$ = absorption coefficient and $S$ = scattering coefficient. From the following data, it seems that both light absorption, determined primarily by the vehicle, and light scattering, determined in part by the grain size, polymer binder turbidity and the unique optical interaction between vehicle-phosphor, control the total extinction of emitted light output from the phosphor.

Examples of the relationship between screen efficiency and extinction are illustrated in table II. Two inorganic ion-containing phosphor screens are placed on an opaque support. Said screens have different vehicle compositions and concentrations, but contain the same phosphor and are compared for speed at the same phosphor coverage. It is seen that the screen with the lesser amount of vehicle has the lowest extinction coefficient across the emission range of the phosphor. The vehicle is the physical mixture of Lexan [a trademark of General Electric for poly(bisphenol A carbonate)] and copoly(bisphenol A carbonate-tetramethylene oxide). The phosphor is barium sulfate, lead activated.

TABLE II

| Vehicle[a] | Phosphor coverage | Screen speed | Extinction Coefficients (cm$^{-1}$) at wave length shown | | |
|---|---|---|---|---|---|
| | | | 325 nm | 375 nm | 425 nm |
| 8% (L+E, 8:2) | 32 | 100 | 79 | 45 | 28 |
| | 40 | 110 | | | |
| 3% (L+E, 3:1) | 32 | 110 | 48 | 27 | 19 |
| | 37 | 130 | | | |

L = poly(bisphenol A carbonate).
E = co-poly(bisphenol A carbonate + tetramethylene oxide).

There is also an apparent relationship between image sharpness and light scattering exhibited by the screen layer. When screens of equal phosphor coverages are compared, visual image sharpness is observed to increase as the scattering coefficient increases over the range from 200 to 400 (cm.$^{11}$). The scatter coefficient is found to be independent of wavelength over the phosphor emission range, and so a single value is sufficient to describe a screen.

It appears that one important reason for the observed relationship between sharpness and light scatter is that is lateral image spread within the screen, contributing to unsharpness, is limited by light scattering. At the lower limit, a screen having nearly matched refractive indices of phosphor and vehicle, does not attenuate light emitted in any direction from a single phosphor grain. It may be that an upper limit of scattering can be attained beyond which an increase in scatter would result in a sharpness decrease, but this does not appear within the range of scattering coefficients for the BaSO$_4$:pb-vehicle combinations.

TABLE III

Extinction and scatter coefficients of the novel screens of the present invention comprising BaSO$_4$:Pb layers in vehicles comprising Lexan(L)-elastomer(E), are demonstrated and compared to those of various other vehicle types. The results clearly establish that extraordinarily high light scatter exists in the screen binders of the present invention which appear to be due in part to the porosity or discontinuous nature of the binder and the interstitial filling in by the phosphor grains. This is confirmed by the fact that inert solvent pass through the binder-phosphor layer.

TABLE III

| Vehicle | Coefficients at 375 nm. (cm.$^{-1}$) | | |
|---|---|---|---|
| | Light scatter (S) | Extinction (K) | Absorption (k) |
| 11% poly(bisphenol A carbonate) (L) | 300 | 60 | 5.9 |
| 11% co-poly(bisphenol A carbonate-tetramethylene oxide) (E) 35/65 ratio | 160 | 19 | 1.2 |
| 11% poly(n-butyl methacrylate) | 119 | 6 | 0.2 |
| 11% co-poly(n-butyl methacrylate-styrene) 80/20 ratio | 144 | 8.5 | 0.3 |
| 11% co-poly(n-butyl methacrylate-n-ethyl hexyl methacrylate) | 120 | 7.8 | 0.3 |
| 11% co-poly(n-butyl methacrylate-n-butyl acrylate) 80/20 ratio | 131 | 7.2 | 0.2 |
| 11% co-poly(n-butyl methacrylate-orthochlorostyrene) 80/20 ratio | 134 | 6.6 | 0.2 |
| 11% co-poly(n-butyl methacrylate-vinyl nonoate) 80/20 ratio | 136 | 56 | 11.2 |
| 11% poly(vinyl acetate) | 109 | 39 | 6.9 |
| 8% (L+E, 9:2) | 366 | 63 | 5.4 |
| 8% co-poly(ethyl acrylate-acrylic acid) | 142 | 28 | 2.7 |

The invention has been described in detail with particular reference to certain preferred embodiments thereof, but it will be understood that variations and modifications can be effected within the spirit and scope of the invention.

I claim:
1. A fluorescent intensifying screen comprising a support bearing a layer comprising a metal ion-containing phosphor and as a binder, a mixture of (a) a polycarbonate having recurring units of the structure having the formula:

(I) 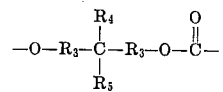

wherein each R$_3$ is a phenylene radical and R$_4$ and R$_5$ when taken separately can each be hydrogen, alkyl or aryl and when taken together can represent the carbon atoms up to 19 necessary to form a cyclic hydrocarbon and (b) an elastomer block copolymer comprising recurring units of (I) copolymerized with blocks composed of recurring units having the following formula:

(II) 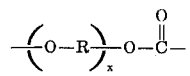

wherein R is an alkylene group and $x$ is an integer such that the molecular weight of the recurring unit $-(O-R-)_x$ is about 100 to 10,000.

2. The intensifying screen of claim 1 in which said polycarbonate comprises recurring units containing an alkylidene bis(arylene) moiety.

3. The screen of claim 1 in which said blocks comprising units having Formula (II) are poly(tetramethylene oxides).

4. The screen of claim 1 in which said blocks comprising units having Formula (II) are aliphatic oxides having from about two to about 20 carbon atoms.

5. A screen of claim 1 in which the said phosphor is an inorganic metal phosphor, said metal selected from the lanthanide group of the periodic table.

6. The screen of claim 1 in which the phosphor is BaSO$_4$:Pb, lead activated barium silicate, Y$_2$O$_3$:Gd, barium fluoride, lead activated strontium sulfate, BaFCl, PbSO$_4$, BaSO$_4$:Ln, europium activated barium strontium sulfate, or SrSO$_4$:Ln where Ln is a lanthanide ion, said phosphor having more than half its emission in the ultraviolet region.

7. The screen of claim 1 in which said support is poly(ethylene terephthalate).

8. The screen of claim 1 in which the ratio of phosphor to binder is in the range of from about 30:1 to about 6:1.

9. The screen of claim 1 in which the phosphor is capable of exhibiting a scatter coefficient in the binder in the range of from about 200 to about 500 cm.$^{11}$.

10. The screen of claim 1 in which the phosphor is contained within an open pore structure binder.

11. The screen of claim 1 in which said polycarbonate and elastomer block copolymer comprising the binder for said phosphor is a discontinuous film 12. The screen of claim 1 in which said binder comprises a physical mixture of an elastomer in combination with a polycarbonate having recurring units of the structure having the following formula:

(III) 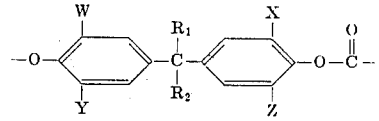

wherein each of W, X, Y and Z represents a member selected from the group consisting of hydrogen, chlorine, fluorine, and methyl and each of R$_1$ and R$_2$ represents a member selected from the group consisting of hydrogen, alkyl radicals or phenyl radicals.

13. The binder of claim 12 in which the weight ratio of (III) to the elastomer copolymer comprising (II) of claim 1 is in the range from about 99:1 to about 50:50.

14. The screen of claim 12 in which the binder polycarbonate which is combined in physical mixture is poly(4,4'-isopropylidenediphenylene carbonate).

15. The screen of claim 12 in which the polycarbonate represented by formula (III) has an inherent viscosity of from about 0.4 to about 3.5.

16. The screen of claim 12 in which the polycarbonate (III) is comprised of from about 3 to about 50 of said recurring blocks.

17. The screen of claim 1 in combination with a radiographic image forming element.

18. The screen combination of claim 17 in which said element contains silver halide.

* * * * *